Oct. 29, 1935.  F. W. SIEVERT  2,018,686
SAW SETTER
Filed Sept. 28, 1933
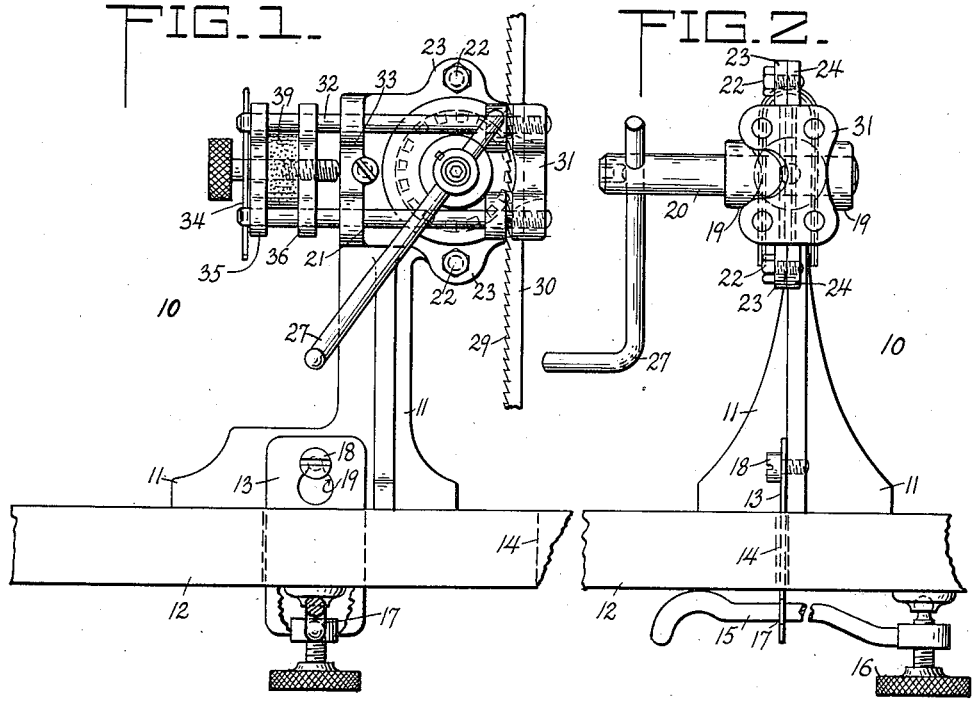
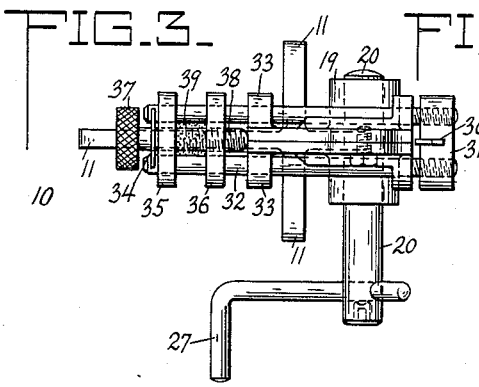
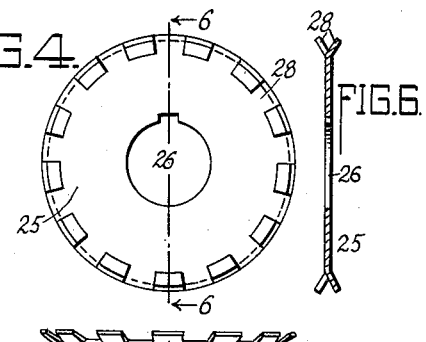
INVENTOR
FREDERICK W. SIEVERT.
BY Harold Dodd
ATTORNEY Patented Oct. 29, 1935

2,018,686

UNITED STATES PATENT OFFICE 2,018,686

SAW SETTER

Frederick W. Sievert, United States Navy

Application September 28, 1933, Serial No. 691,333

4 Claims. (Cl. 76—59)

(Granted under the act of March 3, 1883, as amended April 30, 1928; 370 O. G. 757)

This invention relates to a saw setter and has for an object the provision of an improved saw setter especially adapted for use on setting the teeth of a band saw.

A further object of this invention is to provide a saw setter that can be used to set the teeth of a band saw without the necessity of removing the band saw from its operative position.

A further object of this invention is to provide a saw setter which can be used to set the teeth of a band saw in a minimum amount of time.

A further object of this invention is to provide a saw setter which may be quickly and easily set into position on a band saw table, making use of the saw slot in the table to hold the same in operative position for setting teeth in the band saw passing through the slot.

A still further object of this invention is to provide a saw setter which, while especially useful for a band saw, is not limited in use to band saws but may be used in any type of saw.

A still further object of this invention is to provide a saw setter having a detachable and replaceable saw tooth setting wheel which may be replaced by a wheel having setting teeth of the proper size and set for the particular saw that is to be set.

A further object of this invention is to provide a saw setter having a yielding or cushioning means for adjustably holding the saw blade against the saw setting wheel.

With the above and other objects in view the invention consists in the construction, combination and arrangement of parts as will be described more fully hereinafter.

Reference is to be had to the accompanying drawing forming a part of this specification in which like reference characters indicate corresponding parts throughout the several views, and in which:

Fig. 1 is an elevation side view of the saw setter in operative position;

Fig. 2 is a front view of Fig. 1;

Fig. 3 is a top view of Fig. 1;

Fig. 4 is a detailed view of the saw setting wheel;

Fig. 5 is a top plan view of Fig. 4; and

Fig. 6 is a section on line 6—6 of Fig. 4.

There is shown at 10 the saw setter constituting this invention. Saw setter 10 includes a stand 11, which is adapted to be mounted on the saw table 12 by means of securing plate 13 passing through the saw slot 14 and secured by means of the arm 15 and thumb screw 16 which is used to tighten the end of arm 15 against the bottom of the table, the arm 15 passing through the aperture 17 of the securing plate 13. The plate 13 is secured to the stand 11 by means of a machine screw 18 passing through the aperture 19. As will be obvious, the stand 11 may be quickly and easily secured to the saw table 12 by passing the securing plate 13 through the saw slot 14 and then passing the arm 15 through the aperture 17 in the plate 13, one end of the arm 15 abutting against the bottom of the table and the other end of the arm 15 being securely held on the thumb screw 16. The removal of the device is equally simple. The stand 11 is provided with an apertured boss 19 projecting at one side thereof, which receives a shaft 20 passing through the stand 11. A cover 21 complementary to the upper section of the stand 11 is secured thereto by means of stud bolts 22 passing through the projecting flanges 23 of the cover and 24 of the stand so as to hold the cover 21 sufficiently spaced from the stand 11 to permit the saw setting wheel 25 to rotate therein. The saw setting wheel 25 is provided with the key slot 26 so that it may be secured on the shaft 20 and rotated by means of the crank handle 27. Saw setting teeth 28 are provided with the proper size and pitch according to the size and pitch of the saw teeth 29 of the saw 30 that is to be set, it being observed that as illustrated the saw 30 is a band saw of the endless type that passes through the saw slot 14 of the table 12. The saw blade 30 is held with its teeth 29 against the teeth 28 of the saw setting wheel 25 by means of a clamp 31 which is slotted to permit the saw blade 30 to pass therethrough. The clamp 31 is mounted on the threaded ends of four clamp rods 32, each clamp rod 32 being slidably supported in apertured bosses 33. The ends of the four clamp rods 32 are secured together by a U-shaped clamp pin 34 and by a pair of clamp guide plates 35 and 36, the clamp guide plates 35 and 36 each being apertured to permit the rods 32 to pass therethrough. Clamp guide plate 36 has a threaded aperture centrally thereof to receive a thumb bolt 37 therethrough whose threaded end 38, after passing through the threaded aperture in plate 36, abuts against the rear of the stand 11 and cover 21.

The plate 35 is apertured to permit the threaded end 38 of thumb bolt 37 to pass freely through without contact. A rubber cushion 39 suitably apertured to permit the threaded ends 38 of the bolt 37 to pass freely therethrough is secured between the clamp guide plates 35 and 36. As will be apparent, tightening the thumb bolt 37 will cause the threaded end 38 to abut against the rear of stand 11 and cover 21, causing the plate 36 to press the rubber cushion 39 against the guide plate 35 and thus draw the clamp rods 32 and press the clamp 31 so as to hold the band saw 30 in proper position against the teeth of the saw setting wheel 25. Rotation of the crank handle 27 will then cause the wheel 25 to rotate, drawing the band saw 30 through the slot 31 and bringing its teeth 29 into contact with the teeth of the saw wheel 25, causing the teeth 29 to acquire the same set and pitch as in the teeth 28 of the saw wheel 25.

When setting a saw having different pitch or set of teeth, it is only necessary to remove the cover 21, take off the saw wheel 25, substitute another saw wheel having the appropriate set and pitch, and replace the same, enabling any desired set and pitch of teeth on any saw to be properly adjusted.

While the invention has been described as particularly applicable for a band saw and the securing plate 13 is such that it makes use of the saw slot in the table, it is obvious that this saw setter may be used for any type of saw. It will be observed further that the saw setting wheel 25 when in operative position is in the same plane as the securing plate 13, and inasmuch as the securing plate 13 is in the plane of the saw slot in the table, then the saw setting wheel 25 is likewise in the plane of the band saw 30, thus properly aligning the band saw 30 and the wheel of the device by the mere operation of securing the saw setter in position.

It will be understood that the above description and accompanying drawing comprehend only the general and preferred embodiment of this invention, and that various changes in construction, proportion and arrangement of parts may be made within the scope of the appended claims, and without sacrificing any of the advantages of this invention.

The herein described invention may be manufactured and used by or for the Government of the United States of America for governmental purposes without the payment of any royalties thereon or therefor.

I claim:

1. For use in setting an endless band saw in its operative plane; a saw setter comprising a stand, a saw setting wheel rotatably mounted in said stand, means for yieldably guiding a saw against said wheel and planar means for detachably mounting said saw setting wheel in the operative plane of the band saw being set, said planar means extending through the saw slot in the saw table thereby automatically bringing the saw setting wheel into the operative plane of the saw.

2. A saw setter comprising a stand, a saw setting wheel, means for rotatably mounting said saw setting wheel in said stand, a saw blade clamp, a saw slot in said clamp adapted to receive a saw blade therethrough, yieldable means for mounting said saw clamp to guide the saw blade against said rotatable saw wheel, said yieldable means comprising a plurality of securing rods slidably passing through said stand, said clamp being mounted on one end of said securing rods, adjustable means securing the other ends of said securing rods against said stand and cushioning means between said securing means and said other securing rod ends.

3. For use in setting an endless band saw in its operative plane; a saw setter comprising a stand, a saw setting wheel, means for rotatably mounting said saw setting wheel in said stand, said means comprising a cover complementary to said stand, flanged means securing said cover to said stand, an apertured boss on said stand, a complementary apertured boss on said cover, said cover being spaced from said stand to receive the saw wheel therebetween, and a shaft extending through said apertured bosses, said saw setting wheel being keyed on said shaft, means for rotating said shaft and means for detachably mounting said saw setting wheel in the operative plane of the band saw being set, said latter means extending through the saw slot in the saw table.

4. A saw setter comprising a stand, a saw setting wheel rotatably mounted in said stand, and means extending through the saw slot in the saw table for securing said stand to the saw table, said saw wheel being in the same plane as said securing means passing through the table saw slot, said securing means comprising a securing plate adapted to extend through the saw table slot, an arm, said plate being apertured to receive one end of said arm therethrough, said end adapted to abut the bottom of the saw table of said end of said arm, and means for adjustably pressing the other end of said arm downwardly from said saw table.

FREDERICK W. SIEVERT.